United States Patent [19]

Asay

[11] Patent Number: 4,910,893

[45] Date of Patent: Mar. 27, 1990

[54] MANUALLY OPERATED SNOW PLOW OR OTHER UTILITY DEVICE

[76] Inventor: Zane L. Asay, Rte. 2, Box 2362, Ballard, Utah 84066

[21] Appl. No.: 278,367

[22] Filed: Dec. 1, 1988

[51] Int. Cl.[4] .............................................. E01H 5/02
[52] U.S. Cl. ........................................ 37/281; 37/283; 37/284; 37/285; 56/16.7; 172/364; 172/701.1; 294/49; 294/54.5; 294/57
[58] Field of Search ................. 37/278, 284, 285, 283, 37/281, 264, 265; 294/54.5, 49, 57; 172/701.1, 364; 56/16.7, 16.9

[56] References Cited

U.S. PATENT DOCUMENTS

| 830,871 | 9/1906 | Wilken | 37/283 |
|---|---|---|---|
| 1,524,639 | 1/1925 | Grady | 37/284 |
| 1,526,384 | 2/1925 | Simpson | 37/285 |
| 1,882,945 | 10/1932 | Ross | 37/279 |
| 2,336,553 | 12/1943 | Leunis | 37/284 |
| 2,388,985 | 11/1945 | Martin | 37/283 |
| 2,590,143 | 3/1952 | Adams, Jr. et al. | 37/278 X |
| 2,653,397 | 9/1953 | Butler | 37/241 |
| 2,772,490 | 12/1956 | Hnastchenko | 37/284 |
| 2,803,071 | 8/1957 | Pochopien | 37/283 |
| 2,863,232 | 12/1958 | Steinbach et al. | 37/284 |
| 2,900,744 | 8/1959 | Champain | 37/278 |
| 2,967,363 | 1/1961 | Meier | 37/283 |
| 3,526,979 | 9/1970 | Ladewski | 37/278 X |
| 4,179,828 | 12/1979 | Brunty | 37/241 |
| 4,597,204 | 7/1986 | Heiden | 37/285 |
| 4,757,622 | 7/1988 | Morris | 37/1 |

FOREIGN PATENT DOCUMENTS

| 153537 | 2/1956 | Sweden | 37/278 |
|---|---|---|---|
| 417321 | 10/1934 | United Kingdom | 37/278 |

*Primary Examiner*—Edgar S. Burr
*Assistant Examiner*—Moshe I. Cohen
*Attorney, Agent, or Firm*—Mallinckrodt & Mallinckrodt

[57] ABSTRACT

A manually operated implement for performing a variety of tasks when equipped with a removable and replaceable utility device, includes a wheeled chassis having an elongate, longitudinal, chassis structural member extending forwardly and rearwardly in the implement centrally of the width thereof and a transverse chassis structural member rigidly attached to the rearward end of said longitudinal chassis member. A pair of wheels are rotatably mounted at opposite ends, respectively, of the transverse chassis member. A slide member is mounted for sliding movement on the longitudinal chassis member and includes a clamping screw for clamping the slide in an adjusted position along such member. Handle structure, preferably of V-shape, is pivotally secured to the slide member and slopes upwardly and rearwardly with its upper, rearward end bifurcated to provide transversely spaced hand grips. A pair of crossed, elongate structural member sloping upwardly, from pivotal securement, respectively, at their lower forward ends to opposite ends of the wheel-mounting transverse chassis member, to pivotal securement, respectively, at their upper rearward ends to the handle structure intermediate its length, provides reinforcing for the handle structure. The height of the handle may be adjusted by adjusting the position of the slide. A variety of utility devices, such as a snow plow, scraper, weeder, etc., may be removably secured to the front of the longitudinal chassis member and provisions may be made to removably secure a variety of utility devices, such as a cultivator, rake, weeder, etc. to the implement behind the wheels.

24 Claims, 2 Drawing Sheets

MANUALLY OPERATED SNOW PLOW OR OTHER UTILITY DEVICE

BACKGROUND OF THE INVENTION

1. Field

The invention is in the field of manually operated implements, e.g. snow movers or other utility devices, such as garden tools.

2. State of the Art

A multitude of manually operated snow movers and garden tools have been devised through the years. In each case, the goal was to provide a simple implement that accomplished a specific task with a minimum of effort on the part of the user. The result has been that the average home owner today has a plethora of implements, each designed for a specific task, such as plowing snow, cultivating, raking, leveling, weeding, etc. A few incorporate wheels but most do not.

As an example of the prior art, most manually operated snow movers are in the form of snow shovels which must be lifted by hand. Consequently, the size of the shovel blade has a practical limitation. Some utility devices have been equipped with wheels, which have necessitated the incorporation of extensive frame structure that has added considerably to cost and weight of the implement. In addition, prior wheeled implements have suffered from an undesirable twisting action when pushed against a heavy load. This has apparently been due to inadequate coupling between the operator's handles and the utility device. Further, prior implements have had no provision for adjusting the angle of inclination of the handle, as is often desired.

SUMMARY OF THE INVENTION

The invention is a manually operated, universal implement having interchangeable utility devices for performing various tasks, such as a snow plow, a rake, a broom, a cultivator, a weeder, etc. The implement incorporates a pair of wheels so as to reduce the effort required in its use.

The implement is unique in minimizing structural framework and at the same time providing for adjustability to accommodate operating handle height to the height of various operators of the implement. A wheeled chassis of T-formation single, centrally located, elongate and longitudinally extending chassis members that is normally horizontally disposed during use of the implement, and has a perpendicularly transverse, wheel-mounting, chassis member rigidly attached to its rearward end with provision at its forward end for removably mounting a utility device.

Sloping divergently upwardly from pivotal attachment at its forward end to a slide member adjustably mounted on the longitudinally extending chassis member is handle structure, advantageously of V-shape, terminating at its bifurcated rearward end in a pair of transversely spaced, operator's hand grips. Also provided is reinforcing structure, preferably comprising a pair of reinforcing structural members crossing each other in their upward slope, from pivotal securement at their lower forward ends to opposite ends, respectively, of the wheel-mounting transverse chassis member, to rigid securement at their rearward upper ends to the component members, respectively, of the handle structure intermediate the ends thereof.

As so reinforced, the tendency for the implement to twist in the hands of an operator when encountering heavy loads is significantly reduced, and in most cases eliminated. Further, the handle arrangement and use of the slide enables an operator to easily and quickly adjust the height of the handle so as to accomodate the height of the user, or, since the height adjustment determines the angle of inclination of the handle with respect to the chassis, to change this angle, when desired, to best handle the particular job being done.

It has been found that some tasks, such as plowing snow, are more effectively accomplished when the utility device is positioned in front of the wheels, and that other tasks, such as cultivating or raking, are more effectively accomplished when the utility instrument is positioned behind the wheels. In order to provide means for removably mounting a utility device behind the wheels, an upwardly inclined, elongate rearward extension of the longitudinal chassis member extends longitudinally from pivotal attachment thereto with provision near its rearward end for removably and replaceably attaching a utility device. An upwardly divergent pair of supporting structural members are connected at their lower ends to the rearward end of the rearward extension of the longitudinal chassis member, and have their upper ends connected to divergent component members, respectively, of the handle structure intermediate forward and rearward ends thereof and rearwardly of the extension chassis member, and preferably at the location of the attachment to such component members of the handle structure of the pair of handle reinforcing structural members.

A desirable feature of the invention lies in the shape of the operator's hand grips. These curve downwardly and outwardly, with a radius conducive to easy grasping by the hands of the operator. Thus, such handgrips curve approximately 30° outwardly and 80° downwardly. With such an arrangement, a utility device attached to the basic implement can be easily operated by a person standing to one side of the implement and utilizing only one hand.

THE DRAWINGS

In the accompanying drawings, which illustrate the best mode presently contemplated for carrying out the invention:

FIG. 1 is a perspective view looking from the front and one side of the basic implement;

FIG. 2, a perspective view similar to that of FIG. 1, but showing additional structure at the rear of the implement for mounting utility devices and showing a cover extending between the handle structure;

FIG. 3, a top plan view of the implement of FIG. 2 but with the cover between the handle structure removed;

FIG. 4, a view in side elevation looking from the left in FIG. 2;

FIG. 5, a fragmentary vertical section taken on the line 5—5 of FIG. 3 and drawn to a larger scale; and FIG. 6, a rear perspective view of an embodiment of snow plow for use with the implement having removable side extensions therefor.

DETAILED DESCRIPTION OF THE ILLUSTRATED EMBODIMENT

Figure 1:
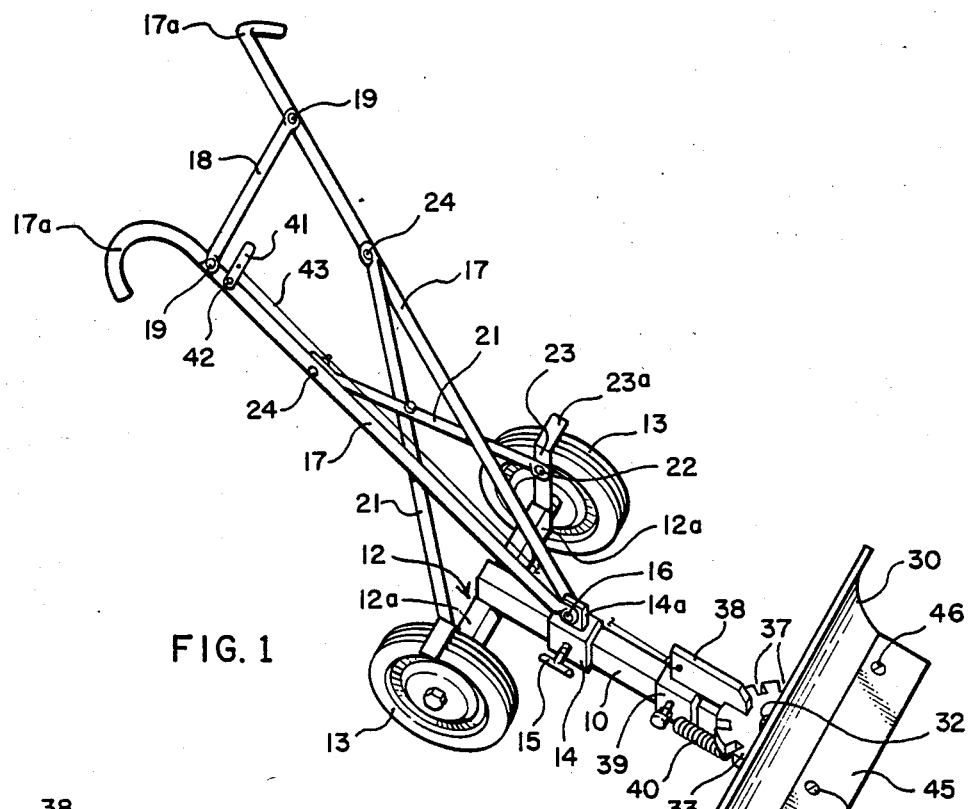
Figure 5:
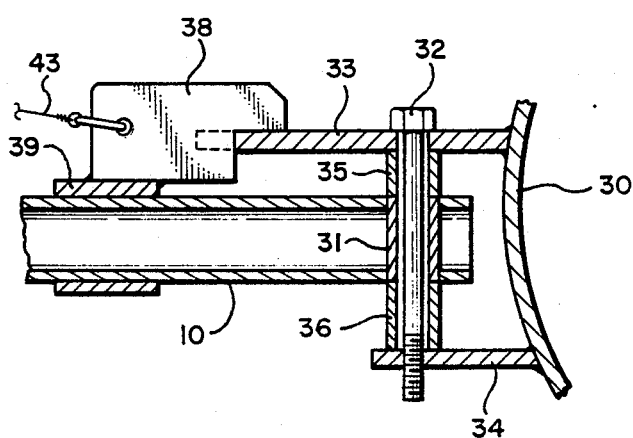

In the form illustrated, the implement of the invention comprises a chassis made up of a single, elongate, structural member 10 extending longitudinally of the implement centrally of its width, so as to be substantially horizontal in normal use of the implement and a transverse structural member 12 crossing longitudinal member 10 at right angles thereto, with equal length portions 12a, respectively, extending oppositely therefrom to the free ends in which are journaled respective wheels 13. Chassis members 10 and 12 are rigidly attached and it is presently preferred that such chassis members be attached by welding. It is also presently preferred that transverse structural member 12 cross longitudinal member 10 below member 10 because this provides increased height to member 10.

Mounted on longitudinal member 10 for sliding movement longitudinally therealong is a slide member 14 arranged to be clamped into a selected position of adjustment by a clamping screw 15. Sloping upwardly from pivotal attachment to slide member 14, as by means of a pivot pin 16 passing through upwardly extending tab 14a, is handle structure, here shown of V-shape and comprising a pair of upwardly sloping and upwardly divergent bars 17, respectively, terminating at their free ends in hand grips 17a, respectively, and cross brace 18 secured, such as by bolts 19, between bars 17 toward their divergent end to maintain the bars 17 in V-shape. The hand grips 17a are advantageously curved outwardly at an angle of approximately thirty degrees and downwardly at an angle of approximately eighty degrees with respect to their corresponding bars 17, so that a person standing to one side of the implement can easily operate it with one hand.

The handle structure is reinforced between it and the chassis structure, so as to resist twisting when the implement is working against heavy loads. As illustrated, the reinforcement structure comprises a pair of crossed elongate structural members 21, respectively, that slope upwardly and rearwardly from pivotal securement of their lower ends, as by means of pivot pins 22, respectively, to opposite ends of the wheel-mounting transverse chassis member 12 (through rigidly attached risers 23) to pivotal securement of their upper ends to bars 17 intermediate the lengths of such bars as by bolts 24. A bolt 25 passes through structural members 21 where they cross.

As so reinforced, the tendency for the implement to twist in the hands of an operator when encountering heavy loads is significantly reduced or eliminated and the handle structure can be easily raised and lowered by sliding slide member 14 along horizontal structural member 10, causing the handle to pivot about the several pivot points during adjustment. Clamping screw 15 is tightened to secure slide member 14 in adjusted position. It is preferred that clamping screw 15 have a large head or a cross member thereon, as shown, so it can be easily turned by a user without need of any tools. In this way, the handle height is easily adjusted by the used without need of any tools.

The basic implement structure as described so far is shown in FIG. 1.

Figure 2:
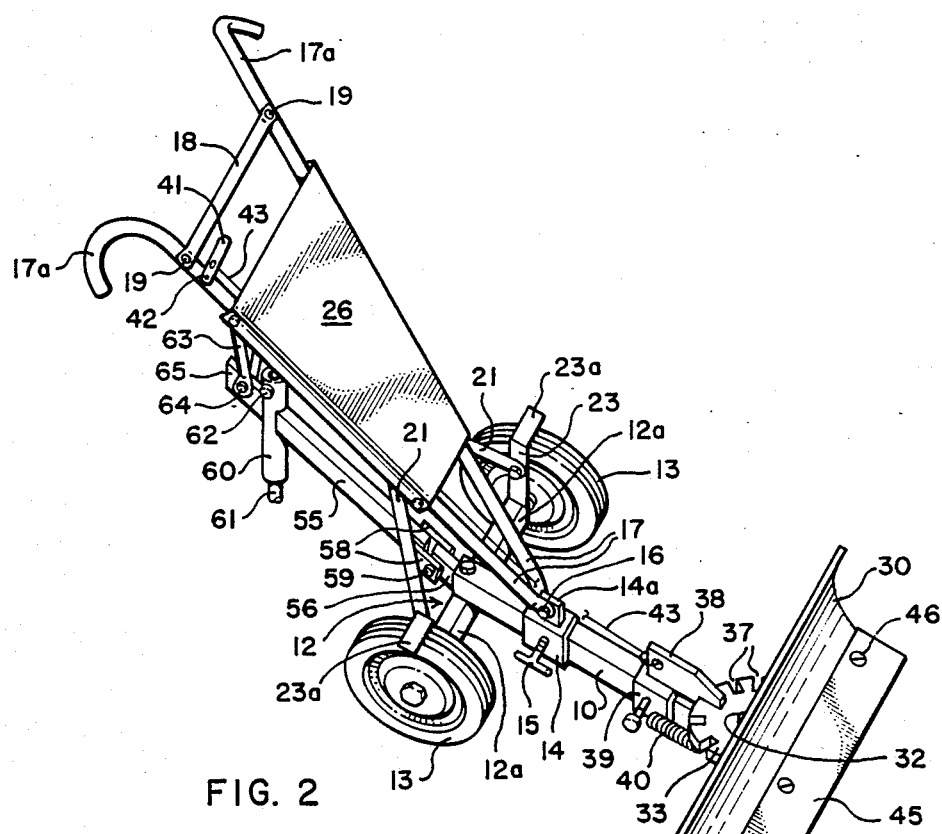
Figure 4:
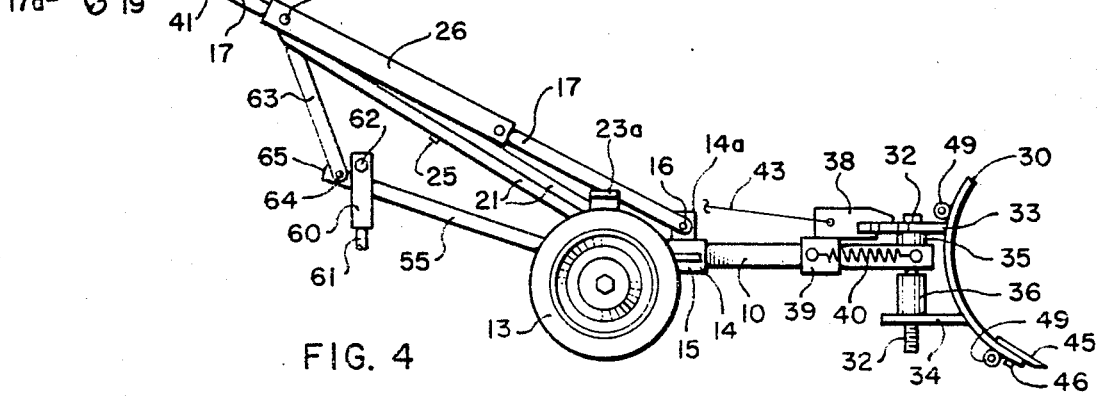

A cover 26, FIGS. 2 and 4, may be attached to and between bars 17 of the handle structure so as to cover the space inbetween and the reinforcing structure and enhance the appearance of the implement as well as adding somewhat to handle reinforcement.

Although various types of utility devices may be removably and replaceably mounted at the forward end of longitudinal chassis member 10 forwardly of the wheels 13, or may be permanently mounted if the implement is to be for a single use, the implement shown is equipped with a blade 30 as a snow plow.

It is desirable to provide longitudinal chassis member 10 as a box beam from a length of standard structural steel tubing of square cross section and, for removably and replaceably mounting utility devices, such as the snow plow shown, a tubular member 31, usually a short length of pipe, is passed vertically through such box beam near its free forward end and is secured in place, as by welding, so as to receive a securement pin 32 or other means for attaching the utility device either pivotally or in fixed condition to the implement proper.

Figure 3:
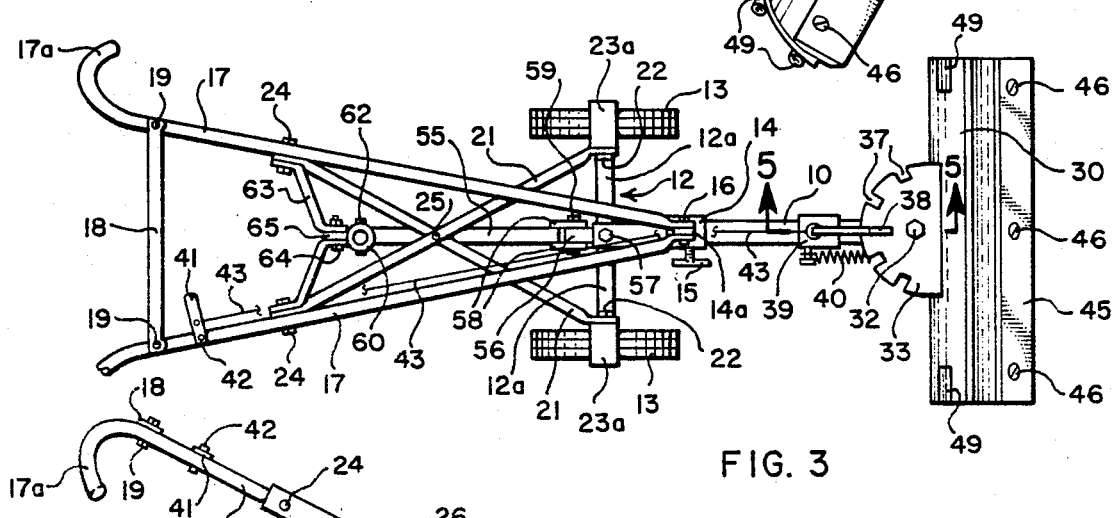

The snow plow utility device shown may have its blade 30 adjustable angularly about the vertical axis provided by pivot pin 32 which pivotally attaches the blade to chassis member 10. Such pin is inserted through receiving openings in rearward upper and lower bracket plates 33 and 34, respectively, that project rigidly from the back of blade 30, through tubular member 31, and through tubular spacers 35 and 36. For ease of mounting and to prevent loss, spacers 35 and 36 may be secured to upper and lower bracket plates 33 and 34, respectively if desired. Lower bracket plate 34 may be threaded to receve a threaded end of pin 32, as shown, or may merely have a receiving hole through which the end of the pin passes, with a nut, spring clip, or other means provided for keeping pin 32 in place. Upper bracket plate 33 is semicircular and has its curved edge margin notched, as at 37, FIG. 3 (in a manner similar to known larger blade devices for attachment to the 3-point hitch of a farm tractor), for receiving a latch element 38 in the confronting notch in any adjusted angular position of the blades to latch it in such adjusting position for the work to be accomplished. Latch element 38 is fastened rigidly to a slide 39 that is slidably mounted on chassis member 10, and may be shifted by hand, but is preferably shifted remotely by the operator from near handle grips 17a. Thus, such latch element 38 and slide 39 are preferably biased forwardly into latching position by a spring 40, but may be manually pulled back out of latching position by the operator pulling on a lever 41 pivoted by bolt 42 to one of the bars 17 adjacent to the hand grip of such bar. Lever 41 is operably connected to latch element 38 by a cable 43. With this arrangement, a user holding the hand grips 17a can release latch element 38 from plate 33 by operating lever 41, lift up on the hand grips to pivot the implement with the blade against the ground to lift wheels 13 above the ground, then move the implement about pivot pin 32 to a desired pivoted position, and then release lever 41 to release latch element 38 to be drawn back into a notch 37 to hold the blade in adjusted position as the implement is lowered to normal position with wheels 13 resting on the ground. Thus, the angular position of the blade can be adjusted by a user while holding the hand grips in normal operating position for the implement and does not require the user to move to the front of the implement and bend down to handle the implement itself to make the angular adjustment.

It is preferred that pivot pin 32 pivotly securing the blade to the front of the implement fit loosely through receiving pipe 31 so that the blade will have a small amount of play, particularly a small amount of rotational play about the longitudinal axis of longitudinal structural member 10 so that the blade can conform to irregularities in the surface being plowed.

It is preferred that for use with the implement of the invention, the plow blade be curved, as shown, so that the bottom of the blade extends forwardly and meets the surface being plowed at a relatively small angle, i.e., less than about 45° and preferably less than about 30°, so that the blade extends under the snow to lift it into the blade rather than merely pushing it. Also, such construction of the blade tends to turn the snow along the blade, if the blade is angled to the direction of travel of the implement to turn the snow off the blade rather than merely pushing it in front of the blade. It has been found that this makes it easy to clear snow, particularly heavy snow, with much less effort than if the blade is merely a straight or flat blade. Further, such configuration gets under and lifts packed snow from a surface to be cleaned much more easily than does a straighter blade which merely tends to ride on top of the packed snow.

It is also preferred that the length of the transverse structural chassis member 12 journaling the wheels 13 be short enough so that the wheels are spaced inside the transverse extent of the edges of the blade, even when angled to longitudinal chassis member, so that the blade can extend over the edge of a sidewalk to the gutter with the wheels still riding on the sidewalk or the blade can easily be pushed along the wall of a building without the wheels hitting the wall. In the latter case, the handle structure is arranged so the handgrips 17a are also located within the transverse extent of the blade.

Figure 6:
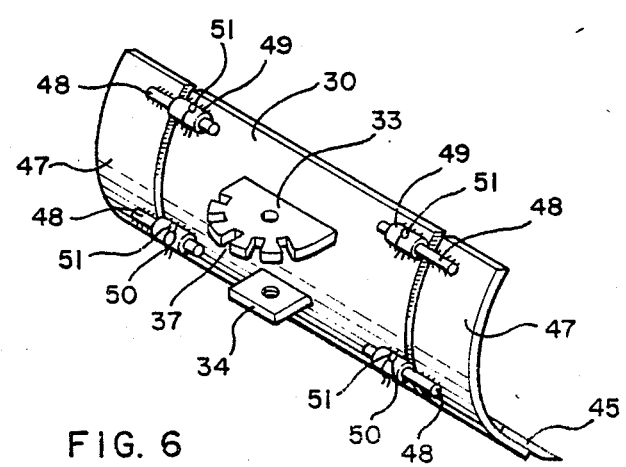

The blade for use with the invention may include a replacable leading edge 45 secured to the bottom of blade 30 by bolts 46. This allows easy replacement of the leading edge if it becomes damaged or bent. The blade may also include side extension blades 47, FIG. 6, having pins 48 extending therefrom adapted to be received by pin receiving sleeves 49 on the sides of the main blade so that the width of the blade may be increased, when desired, for clearing wider areas of snow with a single pass of the implement when the snow is light and easy to move. Pins 48 and receiving sleeves 49 have mating holes 50 therethrough to receive spring clips 51 placed through the holes to lock the blade side extensions in place.

For limiting the amount of snow or mud picked up by wheels 13 when the implement is operated as a snow plow or in a muddy area, it is advantageous to provide blades 23a projecting perpendicularly from risers 23 above such wheels 13. These will scrape the snow or mud from the wheels.

A variety of other utility devices may be similarly pivotally mounted at the front of the implement for angular adjustment or may be attached in fixed position, such as by substituting a bolt for pivot pin 32 and tightening the nut on the bolt to prevent pivotal movement.

For some utility devices, such as cultivators, rakes, and levelers, it has been found advantageous to mount the device behind the wheels rather than in front of the wheels as has been described for the snow plow. In order to provide for such rear mounting of a utility device, the implement may be provided with a rearward extension 55, FIGS. 2-4, of structural member 10, which is pivotally attached to the rear of member 10 and slopes upwardly and longitudinally therefrom. When longitudinal member 10 is made of a box beam, a short length of a smaller box beam 56 may be inserted into the rearward end of member 10, FIGS. 2 and 3, and held in place by set screw 57. Ears 58 welded to the front of extension member 55 accept the end of beam 56 therebetween and a pin 59 passing through the ears and beam 56 provides pivotal mounting of rearward extension 55. short length of pipe 60 for receiving and latching in place a vertical attachment rod 61 of a utility device, not shown, as by means of pin 62, is provided near the rearward end of extension 55.

An upwardly divergent pair of structural members 63 rising from securement of their lower ends, as by a bolt 64 passing through tab 65 extending rearwardly from pipe 60, to securement of their upper ends to bars 17 intermediate the lengths of such bars, support the rearward end of longitudinal extension member 55. The upper ends of members 63 are advantageously secured to bars 17 by bolts 24 which also receive and hold members 21 to the bars 17.

With the arrangement described, various utility devices, such as any one of a number of varieties of rakes, weeders, cultivators, etc. may be removably and replaceably mounted back of the wheels 13, rather than on the forward end of longitudinal structural member 10.

As described and shown, the longitudinally extending chassis member of the implement is welded to the transverse member and each member is made of a structural box beam so no additional bracing between the two is necessary. If, however, the longitudinal member and cross member are made of a weaker material and/or the joint between the two is not strong enough to rigidly hold the two against relative movement when in use, it may be necessary to provide bracing between the two, such as from the front of the longitudinal member to the ends of the transverse member.

It is preferred with the current invention that the longitudinally extending chassis member be of a length to provide a wide range of adjustment for the handle and be long enough to allow the handle to be adjusted to extend back from the device substantially parallel to the longitudinally extending chassis member to provide a substantially flat configuration for easy storage of the implement. In its substantially flat configuration, the implement can be hung on a wall for storage as by handle cross brace 18. Further, a wide range of adjustment for the handle not only allows the handle to be adjusted to best suit the height of the user of the implement, but to be adjusted to best suit the job being done by the implement. Thus, with the handle set high, more downward pressure can be applied by the user to the utility device in use on the implement while a lower setting of the handle will allow more forward pressure to be applied. With the construction described, the handle can be easily adjusted for the particular job to be done. In addition, a change in the handle angle or height will change the balance point of the implement so this too can be easily adjusted to compensate for differnt weights of utility devices attached to the implement to provide a desired balance point for ease of operation.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A manually operated implement for performing a variety of tasks when equipped with a removable and replaceable utility device, comprising a wheeled chassis of T-formation in which an elongate, longitudinal, chassis structural member extends forwardly and rearwardly in the implement centrally of the width thereof and a perpendicularly transverse, chassis structural member is rigidly attached at its center to the rearward end of said longitudinal chassis member; a pair of wheels rotatably mounted at opposite ends, respectively, of said transverse chassis member; a slide member mounted on said longitudinal chassis member for back and forth longitudinal sliding movement therealong; means for clamping said slide member in an adjusted position on said longitudinal chassis member; upwardly and rearwardly sloping handle structure having its lower, forward end pivoted to said slide member and its upper, rearward end bifurcated to provide transversely spaced hand grips; handle reinforcing structure secured to opposite end portions of said transverse chassis member and to said handle structure intermediate its length; and means for removably and replaceably receiving and securing a utility device at the forward end of said longitudinal chassis member.

2. An implement according to claim 1, wherein the means for removably and replaceably mounting a utility device is a vertical tube passing through the longitudinal chassis member near its forward end and is rigidly secured thereto.

3. An implement according to claim 1, including a longitudinal extension of the longitudinal chassis member extending rearwardly and sloping upwardly from pivotal securement to the rear end of the longitudinal chassis member; longitudinal extension support structure secured to the rearward end portion of the longitudinal extension of the longitudinal chassis member and extending to attachment to the handle structure rearwardly of said extension; and means on the rearward end portion of the rearward extension of the longitudinal chassis member for removably and replaceably mounting a utility device.

4. An implement according to claim 3, wherein the means for removably and replaceably mounting a utility device is a substantially vertical pipe attached to the rearward end portion of the rearward extension of the longitudinal chassis member and having a pin-receiving hole passing transversely through said pipe.

5. An implement according to claim 1, wherein the handle structure is V-shaped and comprises a pair of bars diverging rearwardly from pivotal attachment to the slide as the vertex of the V-shape and sloping upwardly to respective terminations in transversely spaced hand grips.

6. An implement according to claim 5, wherein the handle reinforcing structure comprises a pair of crossed elongate structural members sloping upwardly, from pivotal securement, respectively, at their lower forward ends to opposite ends of the wheel-mounting transverse chassis member, to pivotal securement, respectively, at their upper rearward ends to the bars of the handle structure intermediate the lengths of said bars.

7. An implement according to claim 6, wherein each hand grip is curved outwardly at an angle of approximately 30 degrees with respect to the corresponding bar and is curved downwardly at an angle of approximately 80 degrees with respect to the corresponding bar.

8. An implement according to claim 5, wherein the longitudinal chassis member acting as a slideway is of sufficient length to permit the degree of sloping of the handle members to be reduced to approximately zero as to aid in storage of the implement.

9. An implement according to claim 6, wherein the crossed structural members are fastened together at the location of crossing.

10. A manually operated implement, comprising a wheeled chassis of T-formation in which an elongate, longitudinal chassis structural member extends forwardly and rearwardly in the implement centrally of the width thereof and a perpendicularly transverse chassis structural member is rigidly attached at its center to the rearward end of said longitudinal chassis member; a pair of wheels rotatably mounted at opposite ends, respectively, of said transverse chassis member; a slide member mounted on said longitudinal chassis member for back and forth longitudinal sliding movement therealong; means for clamping said slide member in an adjusted position on said longitudinal chassis member; upwardly and rearwardly sloping handle structure having its lower, forward end pivoted to said slide member and its upper, rearward end bifurcated to provide transversely spaced hand-grips; handle reinforcing structure secured to opposite end portions of said transverse chassis member and to said handle structure intermediate its length; and a utility device operably attached to the forward end of said longitudinal chassis member.

11. An implement according to claim 10, wherein the handle structure is V-shaped and comprises a pair of bars diverging rearwardly from pivotal attachment to the slide as the vertex of the V-shape and sloping upwardly to respective terminations in transversely spaced hand grips.

12. An implement according to claim 11, wherein the handle reinforcing structure comprises a pair of crossed elongate structural members sloping upwardly, from pivotal securement, respectively, at their lower forward ends to opposite ends of the wheel-mounting transverse chassis member, to pivotal securement, respectively, at their upper rearward ends to the bars of the handle structure intermediate the lengths of said bars.

13. An implement according to claim 12, wherein each hand grip is curved outwardly at an angle of approximately 30 degrees with respect to the corresponding bar and is curved downwardly at an angle of approximately 80 degrees with respect to the corresponding bar.

14. An implement according to claim 10, wherein the utility device is a snow plow and the transverse spacing between the outermost faces of the pair of wheels and also the transverse space between the outermost points of the handle structure is less than the width of said snow plow.

15. An implement according to claim 10, wherein a vertical tube is passed through the longitudinal chassis member near its forward end and is rigidly secured thereto; and wherein the utility device is equipped with mounting structure comprising upper and lower substantially horizontal bracket plates extending rearwardly above and below said chassis member, respectively; and a vertical pin extending through said bracket plates and said chassis member.

16. An implement according to claim 15, wherein the upper bracket plate is semicircular rearwardly thereof and notched at intervals around its semicircular edge margin; wherein there is a notch-confronting latch member for insertion in a confronting notch with the utility device in an adjusted position; and means operable by an operator of the implement for inserting said latch member in a confronting notch to lock the blade in its adjusted position.

17. An implement according to claim 16, wherein the means operable by an operator of the implement is a lever pivoted to the handle structure adjacent to a hand grip thereof; a spring normally urging the latch member toward the notched edge margin of the upper bracket plate; and a cable connecting said lever with said latch member for enabling the operator to pull the latch member backwardly against the urge of said spring to unlatch the blade from any adjusted and locked position thereof.

18. An implement according to claim 15, wherein the vertical pin extending through the verticle tube mounting the utility device to the implement fits loosely through the tube so that the device is mounted with some play to the implement.

19. An implement according to claim 10, wherein the utility device is a transverse blade for snow removal or other work centrally mounted at the forward end of the longitudinal chassis member for angular positionl adjustment about a vertical axis at said forward end coincident with a pivotal mounting comprising upper and lower substantially horizontal bracket plates extending rearwardly from said blade above and below said chassis member, respectively, and a vertical pivot pin extending through said bracket plates and said chassis member.

20. An implement according to claim 19, wherein the upper bracket plate is semicircular rearwardly thereof and notched at intervals around the its semicircular edge margin; wherein there is a notch-confronting latch member for insertion in a confronting notch with the utility device in an adjusted position; and means operable by an operator of the implement for inserting said latch member in a confronting notch to lock the blade in its adjusted position.

21. An implement according to claim 20, wherein the means operable by an operator of the implement is a lever pivoted to the handle structure adjacent to a hand grip thereof; a spring normally urging the latch member toward the notched edge margin of the upper bracket plate; and a cable connecting said lever with said latch member for enabling the operator to pull the latch member backwardly against the urge of said spring to unlatch the blade from any adjusted and locked position thereof.

22. An implement according to claim 21, wherein the vertical pin extending through the verticle tube mounting the utility device to the implement fits loosely through the tube so that the device is mounted with some play to the implement.

23. An implement according to claim 14, wherein the blade is curved and mounted with respect to the implement so that the lower edge of the blade extends forwardly of the upper edge of the blade to thereby extend under the snow and lift the snow into the blade.

24. An implement according to claim 19, including at least one side extension for the blade, and means for securing said side extension to one of the sides of the blade.

* * * * *